United States Patent
Zhang et al.

(10) Patent No.: US 10,214,919 B2
(45) Date of Patent: Feb. 26, 2019

(54) GLUE-FREE ANTISLIP PLASTIC FLOORBOARD AND MANUFACTURING METHOD THEREOF

(71) Applicant: Xiaoling Zhang, Changzhou (CN)

(72) Inventors: Xiaoling Zhang, Changzhou (CN); Zhiyuan Xiao, Changzhou (CN)

(73) Assignee: Xiaoling Zhang, Changzhou (CN)

( * ) Notice: Subject to any disclaimer, the term of this patent is extended or adjusted under 35 U.S.C. 154(b) by 394 days.

(21) Appl. No.: 15/022,613

(22) PCT Filed: Apr. 4, 2014

(86) PCT No.: PCT/CN2014/074805
§ 371 (c)(1),
(2) Date: Mar. 17, 2016

(87) PCT Pub. No.: WO2015/089958
PCT Pub. Date: Jun. 25, 2015

(65) Prior Publication Data
US 2016/0230399 A1    Aug. 11, 2016

(30) Foreign Application Priority Data

Dec. 19, 2013    (CN) .......................... 2013 1 0699337

(51) Int. Cl.
*B32B 27/12*    (2006.01)
*E04F 15/02*    (2006.01)
(Continued)

(52) U.S. Cl.
CPC .......... *E04F 15/02172* (2013.01); *B32B 5/02* (2013.01); *B32B 5/028* (2013.01);
(Continued)

(58) Field of Classification Search
CPC .......... B32B 2037/243; B32B 2250/05; B32B 2255/10; B32B 2255/26; B32B 2262/101;
(Continued)

(56) References Cited

FOREIGN PATENT DOCUMENTS

| CN | 202265992 U | 6/2012 |
| CN | 102561657 A | 7/2012 |

(Continued)

OTHER PUBLICATIONS

International Search Report issued in corresponding application No. PCT/CN2014/074805 dated Sep. 29, 2014 (4 pages).

*Primary Examiner* — Elizabeth M Cole
(74) *Attorney, Agent, or Firm* — Osha Liang LLP

(57) ABSTRACT

A glue-free antislip plastic floorboard and a manufacturing method thereof, comprising from a top to a bottom a wear-resistance layer, a printing layer, a polyvinyl chloride (PVC) medium material layer, a glass fiber, a PVC medium material layer, a PVC bottom layer and a PVC antislip layer. Component composition of PVC medium material: a weight percentage of PVC resin is 13-15.42%, a weight percentage of calcium carbonate is 74-75.55%, a weight percentage of a plasticizer is 10-11%, a weight percentage of a stabilizer is 0.25-0.28%, and a weight percentage of carbon black is 0.2-0.3%. Component composition of PVC bottom material: a weight percentage of the PVC resin is 34.7-40%, a weight percentage of the calcium carbonate is 34-40%, a weight percentage of the plasticizer is 24-24.9%, a weight percentage of the stabilizer is 0.7-0.8%, and a weight percentage of the black carbon is 0.4-0.5%.

4 Claims, 1 Drawing Sheet

(51) Int. Cl.
| | |
|---|---|
| *E04F 15/10* | (2006.01) |
| *B32B 27/08* | (2006.01) |
| *B32B 27/20* | (2006.01) |
| *B32B 27/22* | (2006.01) |
| *B32B 27/30* | (2006.01) |
| *B32B 5/02* | (2006.01) |
| *B32B 37/00* | (2006.01) |
| *B32B 37/14* | (2006.01) |
| *E04C 1/00* | (2006.01) |
| *B32B 37/06* | (2006.01) |
| *B32B 37/24* | (2006.01) |

(52) U.S. Cl.
CPC .............. *B32B 27/08* (2013.01); *B32B 27/12* (2013.01); *B32B 27/20* (2013.01); *B32B 27/22* (2013.01); *B32B 27/304* (2013.01); *B32B 37/0015* (2013.01); *B32B 37/144* (2013.01); *E04C 1/00* (2013.01); *E04F 15/102* (2013.01); *E04F 15/105* (2013.01); *E04F 15/107* (2013.01); *B32B 37/06* (2013.01); *B32B 2037/243* (2013.01); *B32B 2250/05* (2013.01); *B32B 2255/10* (2013.01); *B32B 2255/26* (2013.01); *B32B 2262/101* (2013.01); *B32B 2264/104* (2013.01); *B32B 2307/554* (2013.01); *B32B 2307/736* (2013.01); *B32B 2307/744* (2013.01); *B32B 2307/75* (2013.01); *B32B 2309/125* (2013.01); *B32B 2327/06* (2013.01); *B32B 2419/04* (2013.01); *B32B 2471/00* (2013.01)

(58) Field of Classification Search
CPC ........ B32B 2264/104; B32B 2307/554; B32B 2307/736; B32B 2307/744; B32B 2307/75; B32B 2309/125; B32B 2327/06; B32B 2419/04; B32B 2471/00; B32B 27/08; B32B 27/12; B32B 27/20; B32B 27/22; B32B 27/304; B32B 37/0015; B32B 37/06; B32B 37/144; B32B 5/02; B32B 5/028; E04C 1/00; E04F 15/02172; E04F 15/102; E04F 15/105; E04F 15/107
See application file for complete search history.

(56) References Cited

FOREIGN PATENT DOCUMENTS

| CN | 103046723 A | 4/2013 |
|---|---|---|
| CN | 103074990 A | 5/2013 |

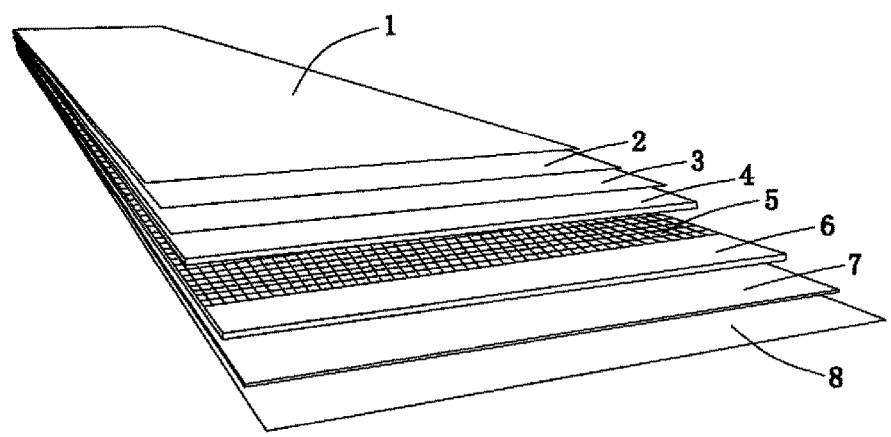

GLUE-FREE ANTISLIP PLASTIC FLOORBOARD AND MANUFACTURING METHOD THEREOF

BACKGROUND OF THE INVENTION

1. Field of the Invention

The present invention relates to a plastic floorboard and a manufacturing method thereof, and more particularly to a glue-free antislip plastic floorboard and a manufacturing method thereof.

2. Description of the Prior Art

A prior floorboard is directly installed without locking structures and does not need glue during installation. This glue-free floorboard generally focuses on an antislip effect of a bottom surface of the floorboard, and the antislip effect is realized by a special embossing pattern on the bottom surface, such as a Chinese patent application publication No. CN102561657A. For the glue-free floorboard, even if it has a better antislip effect, the peripheral of the floorboard needs to be installed by relaying on a wall or being fixed. Therefore, it does not need to excessively pursue the antislip effect of the bottom surface of the floorboard and that is no much function.

In technology, the glue-free floorboard mainly faces the following key problems:

1. When the ground is uneven, the floorboard will have height difference. Because the ground can not be completely smooth and the glue-free floorboard does not use glue and lock, the height difference of joint surfaces of the adjacent floorboards is different controlled when the ground is slightly uneven.

2. When the floorboard is used for a long time, edges of the floorboard will be warped. The floorboard is formed by multiple layers of raw materials with different compositions. Because of the temperature change, under the function of stresses of the different materials, the edges of the floorboard is easy to be warped and cause an installation failure.

3. The floorboard has a contraction-expansion problem. Any plastic floorboard can produce contraction and expansion. How to effectively control the size change of the floorboard, and how to try to reduce the gap in a long-term using process of the floorboard, these problems are becoming very critical.

BRIEF SUMMARY OF THE INVENTION

In order to overcome the defects of the prior art, the present invention provides a glue-free antislip plastic floorboard and a manufacturing method thereof, wherein the floorboard has a good flexibility, the flexibility and the slip resistance thereof are balanced, it is not easy to be warped, can effectively control the size change of the contraction and expansion, and can be naturally kept on the ground.

To achieve the above object of the present invention, the present invention adopts the following technical solution.

A glue-free antislip plastic floorboard comprises from a top to a bottom a wear-resistance layer, a printing layer, a PVC medium material layer, a glass fiber, a PVC medium material layer, a PVC bottom material layer and a PVC antislip layer. Compositions of the PVC medium material layers comprise: PVC resin from 13 to 15.42 weight percent, calcium carbonate from 74 to 75.55 weight percent, plasticizer from 10 to 11 weight percent, stabilizer from 0.25 to 0.28 weight percent and carbon black from 0.2 to 0.3 weight percent. Compositions of the PVC bottom material layer comprise: PVC resin from 34.7 to 40 weight percent, calcium carbonate from 34 to 40 weight percent, plasticizer from 24 to 24.9 weight percent, stabilizer from 0.7 to 0.8 weight percent and carbon black from 0.4 to 0.5 weight percent.

Further, the compositions of the PVC medium material layers comprise about 13 weight percent PVC resin, about 75.55 weight percent calcium carbonate, about 11 weight percent plasticizer, about 0.25 weight percent stabilizer, and about 0.2 weight percent carbon black; and the compositions of the PVC bottom material layer comprise: about 34.7 weight percent PVC resin, about 40 weight percent calcium carbonate, about 24 weight percent plasticizer, about 0.8 weight percent stabilizer, and about 0.5 weight percent carbon black.

Further, the compositions of the PVC medium material layers comprise about 15.42 weight percent PVC resin, about 74 weight percent calcium carbonate, about 10 weight percent plasticizer, about 0.28 weight percent stabilizer, and about 0.3 weight percent carbon black; and the compositions of the PVC bottom material layer comprise: about 40 weight percent PVC resin, about 34 weight percent calcium carbonate, about 24.9 weight percent plasticizer, about 0.7 weight percent stabilizer, and about 0.4 weight percent carbon black.

Further, the glue-free antislip plastic floorboard further comprises a PU coating located on the wear-resistance layer.

A manufacturing method of a glue-free antislip plastic floorboard comprises the following steps of:

1) laying from a top to a bottom a wear-resistance layer (2), a printing layer (3), a PVC medium material layer (4), a glass fiber (5), a PVC medium material layer (6), a PVC bottom material layer (7) and a PVC antislip layer (8);

2) baking after laying, a baking temperature being from 125 to 130 degrees celsius, a baking process being divided into three sections of pressure: a first section of pressure being 30 kg per square meter and a baking time thereof being 40 min; a second section of pressure being 50 kg per square meter and a baking time thereof being 4 min; and a third section of pressure being 70 kg per square meter and a baking time thereof being 15 min;

3) cooling and removing; and 4) performing a tempering process, a tempering temperature being greater than 95 degrees Celsius.

Further, the step 1) further comprises a step of laying a PU coating on the wear-resistance layer (2).

The present invention has the following beneficial effects:

1. The flexibility and the slip resistance of the overall floorboard are balanced by adjusting and optimizing the collocation of compositions of the floorboard. Even if the ground is slightly uneven, the floorboard can be naturally kept on the ground by the flexibility of the material itself.

2. The floorboard need be slightly arched by manufacturing, so even if the temperature changes, the floorboard will not be warped under the function of stresses of the materials or factors of the uneven ground. Due to the weight of the floorboard, the slight arch of the floorboard will not cause any appearance problems, but only make the floorboard more flat on the ground, thereby saving a lot of the cost of the manual installation.

3. A glass fiber is added into the floorboard and a tempering temperature is increased and is controlled in a manufacturing process, thus the floorboard can effectively control the size change in the contraction and expansion, and can avoid the problems of a larger gap in a long-term using process without glue and lock.

BRIEF DESCRIPTION OF THE DRAWINGS

FIG. 1 is a structural schematic view of a glue-free antislip plastic floorboard of the present invention.

REFERENCE NUMERALS

1 PU coating
2 wear-resistance layer
3 printing layer
4 PVC medium material layer
5 glass fiber
6 PVC medium material layer
7 PVC bottom material layer
8 PVC antislip layer

DETAILED DESCRIPTION OF THE PREFERRED EMBODIMENTS

The following text will further describe the present invention with reference to the accompanying drawings.

A glue-free antislip plastic floorboard comprises from a top to a bottom a PU coating 1, a wear-resistance layer 2, a printing layer 3, a polyvinyl chloride (PVC) medium material layer 4, a glass fiber 5, a PVC medium material layer 6, a PVC bottom material layer 7 and a PVC antislip layer 8. In the glue-free antislip plastic floorboard, the PU coating 1, the wear-resistance layer 2, the printing layer 3 and the PVC antislip layer 8 all adopt compositions of the existing glue-free antislip plastic floorboard. The glass fiber 5 is added between the PVC medium material layer 4 and the PVC medium material layer 6. The present invention improves compositions of the PVC medium material layer 4, the PVC medium material layer 6 and the PVC bottom material layer 7.

Wherein, the compositions of the PVC medium material layer 4 and the PVC medium material layer 6 of the floorboard are shown in TABLE 1:

TABLE 1

| raw material | weight percent (%) |
| --- | --- |
| PVC resin | 13~15.42 |
| calcium carbonate | 74~75.55 |
| plasticizer (dioctyl terephthalate) | 10~11 |
| stabilizer | 0.25~0.28 |
| black carbon | 0.2~0.3 |

The compositions of the PVC bottom material layer 7 are shown in TABLE 2:

TABLE 2

| raw material | weight percent (%) |
| --- | --- |
| PVC resin | 34.7~40 |
| calcium carbonate | 34~40 |
| plasticizer (dioctyl terephthalate) | 24~24.9 |
| stabilizer | 0.7~0.8 |
| black carbon | 0.4~0.5 |

In a first embodiment of the present invention, preferably, the compositions of the PVC medium material layer 4 and the PVC medium material layer 6 are shown in TABLE 3:

TABLE 3

| raw material | weight percent (%) |
| --- | --- |
| PVC resin | 13 |
| calcium carbonate | 75.55 |
| plasticizer (dioctyl terephthalate) | 11 |
| stabilizer | 0.25 |
| black carbon | 0.2 |

In the first embodiment, preferably, the compositions of the PVC bottom material layer 7 are shown in TABLE 4:

TABLE 4

| raw material | weight percent (%) |
| --- | --- |
| PVC resin | 34.7 |
| calcium carbonate | 40 |
| plasticizer (dioctyl terephthalate) | 24 |
| stabilizer | 0.8 |
| black carbon | 0.5 |

In a second embodiment of the present invention, preferably, the compositions of the PVC medium material layer 4 and the PVC medium material layer 6 are shown in TABLE 5:

TABLE 5

| raw material | weight percent (%) |
| --- | --- |
| PVC resin | 15.42 |
| calcium carbonate | 74 |
| plasticizer (dioctyl terephthalate) | 10 |
| stabilizer | 0.28 |
| black carbon | 0.3 |

In the second embodiment, preferably, the compositions of the PVC bottom material layer 7 are shown in TABLE 6:

TABLE 6

| raw material | weight percent (%) |
| --- | --- |
| PVC resin | 40.0 |
| calcium carbonate | 34 |
| plasticizer (dioctyl terephthalate) | 24.9 |
| stabilizer | 0.7 |
| black carbon | 0.4 |

The present invention provides a manufacturing method of the glue-free antislip plastic floorboard, which comprises the following steps:

Step 1) is laying from a top to a bottom a wear-resistance layer 2, a printing layer 3, a PVC medium material layer 4, a glass fiber 5, a PVC medium material layer 6, a PVC bottom material layer 7 and a PVC antislip layer 8;

Step 2) is baking after laying. A baking temperature is from 125 to 130 degrees Celsius. A baking process is divided into three sections of pressure: a first section of pressure, a second section of pressure and a third section of pressure. The first section of pressure is 30 kg per square meter, and a baking time thereof is 40 min. The second section of pressure is 50 kg per square meter, and a baking time thereof is 4 min. The third section of pressure is 70 kg per square meter, and a baking time thereof being 15 min.

Step 3) is cooling and removing; and

Step 4) is performing a tempering process. A tempering temperature is greater than 95 degrees Celsius.

In the above step 1), it further comprises a step of laying a PU coating on the wear-resistance layer 2.

As described above, the flexibility and the slip resistance of the overall floorboard are balanced by adjusting and optimizing the collocation of compositions of the floorboard. Even if the ground is slightly uneven, the floorboard can be naturally kept on the ground by the flexibility of the material itself.

The floorboard need be slightly arched by manufacturing, so even if the temperature changes, the floorboard will not be warped under the function of stresses of the materials or factors of the uneven ground. In the present invention, a warping index of the floorboard after heating is less than 0.5 mm, which is completely in line with EN434 standard of the European standard. Moreover, a size change rate of the floorboard after heating is less than 0.08 percent, which is completely in line with EN434 standard of the European standard. Due to the weight of the floorboard, the slight arch of the floorboard will not cause any appearance problems, but only make the floorboard more flat on the ground, thereby saving a lot of the cost of the manual installation.

Furthermore, the glass fiber 5 is added into the floorboard and the tempering temperature is increased to exceed 90 degree and is controlled in the manufacturing process, thus the floorboard can effectively control the size change in the contraction and expansion, and can avoid the problems of a larger gap in a long-term using process without glue and lock.

The technical scope of the present invention is not limited to the above description of the contents. Any person who skilled in the art may deform and modify the embodiment of the present invention within the spirit and scope of the appended claims, but these deformation and modification belong to the protection scope of the present invention.

What is claimed is:

1. A glue-free antislip plastic floorboard, characterized in that: comprising from a top to a bottom a wear-resistance layer, a printing layer, a PVC medium material layer, a glass fiber, a PVC medium material layer, a PVC bottom material layer and a PVC antislip layer; wherein compositions of the PVC medium material layers comprise:
   PVC resin from 13 to 15.42 weight percent, calcium carbonate from 74 to 75.55 weight percent, plasticizer from 10 to 11 weight percent, stabilizer from 0.25 to 0.28 weight percent, and carbon black from 0.2 to 0.3 weight percent, wherein compositions of the PVC bottom material layer comprise: PVC resin from 34.7 to 40 weight percent, calcium carbonate from 34 to 40 weight percent, plasticizer from 24 to 24.9 weight percent, stabilizer from 0.7 to 0.8 weight percent, and carbon black from 0.4 to 0.5 weight percent.

2. The glue-free antislip plastic floorboard as claimed in claim 1, characterized in that: the compositions of the PVC medium material layers comprise about 13 weight percent PVC resin, about 75.55 weight percent calcium carbonate, about 11 weight percent plasticizer, about 0.25 weight percent stabilizer, and about 0.2 weight percent carbon black; and the compositions of the PVC bottom material layer comprise: about 34.7 weight percent PVC resin, about 40 weight percent calcium carbonate, about 24 weight percent plasticizer, about 0.8 weight percent stabilizer, and about 0.5 weight percent carbon black.

3. The glue-free antislip plastic floorboard as claimed in claim 1, characterized in that: the compositions of the PVC medium material layers comprise about 15.42 weight percent PVC resin, about 74 weight percent calcium carbonate, about 10 weight percent plasticizer, about 0.28 weight percent stabilizer, and about 0.3 weight percent carbon black; and the compositions of the PVC bottom material layer comprise: about 40 weight percent PVC resin, about 34 weight percent calcium carbonate, about 24.9 weight percent plasticizer, about 0.7 weight percent stabilizer, and about 0.4 weight percent carbon black.

4. The glue-free antislip plastic floorboard as claimed in claim 3, characterized in that: further comprising a PU coating located on the wear-resistance layer.

* * * * *